United States Patent [19]

Ostenberg et al.

[11] 4,290,223
[45] Sep. 22, 1981

[54] FISHERMAN'S LEADER/LINE DISPENSER AND DECOILER

[75] Inventors: John R. Ostenberg; Kenneth M. Ligas, both of Boulder, Colo.

[73] Assignee: Creative Anglers

[21] Appl. No.: 61,330

[22] Filed: Jul. 27, 1979

[51] Int. Cl.³ ............................................. A01K 91/00
[52] U.S. Cl. ................................ 43/54.5 R; 43/44.98; 43/43.11; 242/137.1
[58] Field of Search ............... 43/25, 43.11, 44.98, 43/54.5 R; 242/137, 137.1, 138, 146, 129.8, 71.1; 206/63.5, 409; 140/147; 225/52, 54

[56] References Cited

U.S. PATENT DOCUMENTS

| | | | |
|---|---|---|---|
| 1,850,074 | 3/1932 | Crandall | 43/54.5 R |
| 2,022,091 | 11/1935 | Scharnhorst | 43/44.98 X |
| 2,656,131 | 10/1953 | Johnson | 225/52 X |
| 2,785,869 | 3/1957 | Howard | 43/54.5 R |
| 2,875,963 | 3/1959 | Collins | 225/52 X |
| 2,929,541 | 3/1960 | Castelli | 242/138 X |
| 3,138,309 | 6/1964 | Hulterstrum | 43/43.11 X |
| 3,581,424 | 6/1971 | Bloom | 43/25 |
| 4,026,063 | 5/1977 | Allen | 43/54.5 R |

Primary Examiner—Stephen G. Kunin
Assistant Examiner—Robert P. Olszewski
Attorney, Agent, or Firm—John J. Byrne

[57] ABSTRACT

A fisherman's leader and/or line dispenser and decoiler including an enclosed container and spool of fisherman's leader/line mounted within the container. A pair of first and second resilient pads are mounted within the container in a posture of opposing engagement and the resilient character of the pad material provides mutual self-biasing of the pads together. An aperture is provided through a portion of the container whereby a fisherman's leader/line may be threaded from the spool through the opposed resilient pads and out of the container so that a fisherman in withdrawing a length of leader/line will pull the leader/line through the resilient pads to erase coil memory during the dispensing operation.

6 Claims, 3 Drawing Figures

FISHERMAN'S LEADER/LINE DISPENSER AND DECOILER

BACKGROUND OF THE INVENTION

This invention relates to an apparatus for dispensing fishing leaders and/or lines. More specifically this invention relates to a fisherman's leader/line dispenser suitable for facilely dispensing a leader/line length and concomitantly erasing coil memory of the length of leader/line dispensed.

A fisherman's tackle typically comprises a rod, reel, line, a fly or bait and a relatively short length of monofilament strand, called a leader, which connects the free end of the line to the fly. The length of the leader may vary but in general may be three to twelve feet.

As noted above, leaders are typically composed of a monofilament strand composed of a nylon composition or the like and are sold in various test weights and lengths of twenty-five yards or more wound upon small spools of approximately one inch or so in diameter. In addition a fishing line may be composed of a strand material such as a nylon composition which is wound on spool and sold in various test weights and lengths.

While fishing, if an angler's leader/line breaks, he will reach into a tacke box, pick up a spool of leader/line and draw out a few feet, as desired, and replace the broken section. Unfortunately, this apparently uneventful process may entail some difficulties. More specifically, when a typical leader/line material is withdrawn and cut off it tends to coil up in accordance with its memory on the spool. Further, previously known leader dispensers tend to permit the leader to coil back onto the spool which tends to make relocating the free end of the leader/line difficult and/or permit the leader/line to become tangled upon the spool.

In addition to the above patent, leader/line dispensers typically require a separate cutting device to sever the line. Further typical leader/line dispensers permit monofilament material to be deteriorated by ultraviolet light.

The difficulties suggested in the preceding are not intended to be exhaustive, but rather are among many which may tend to reduce the effectiveness and user satisfaction of previously known fisherman's leader/line dispensers. Other noteworthy problems may also exist; however, those presented above should be sufficient to demonstrate that leader/line dispensers appearing in the past will admit to worthwhile improvement.

OBJECTS OF THE INVENTION

It is therefore a general object of the invention to provide a novel fisherman's leader/line dispenser and decoiler which will obviate or minimize difficulties of the type previously described.

It is a specific object of the invention to provide a novel fisherman's leader/line dispenser and decoiler wherein coil memory of the monofilament leader/line material is erased as the leader/line is dispensed.

It is another object of the invention to provide a novel fisherman's leader/line dispenser and decoiler wherein the free end of the leader/line material is maintained and easily reached for subsequent dispensing operations.

It is a further object of the invention to provide a novel fisherman's leader/line dispenser and decoiler wherein a length of leader/line strand may be facilely severed from the spool without utilizing a separate cutting instrument.

It is still a further object of the invention to provide a novel fisherman's leader/line dispenser and decoiler wherein the monofilament material is isolated from ultraviolet deterioration while the leader/line is stored.

BRIEF SUMMARY OF A PREFERRED EMBODIMENT OF THE INVENTION

A fisherman's leader/line dispenser and decoiler in accordance with a preferred embodiment of the invention which is intended to accomplish at least some of the foregoing objects includes a container having side walls, a bottom and a top. A spool of fisherman's leader/line is mounted within the container along with first and second resilient pad means. The resilient pads are mounted within the container in an opposing posture and are mutually self-biased into engagement. An aperture is provided through the container whereby a fisherman's leader/line may be threaded from the spool through the mutually opposed resilient pads and away from the container such that an angler in drawing a length of leader/line from the container pulls the leader through the first and second resilient pads and erases coil memory of the length of leader/line as it is dispensed.

THE DRAWINGS

Other objects and advantages of the present invention will become apparent from the following detailed description of a preferred embodiment thereof taken in conjunction with the accompanying drawings, wherein:

FIG. 1 is an axonometric view of a fisherman's leader/line dispenser and decoiler in accordance with a preferred embodiment of the invention;

FIG. 2 is a cross-sectional view taken along section line 2—2 in FIG. 1 and discloses a leader/line spool within the dispenser and decoiler as well as a pair of mutually opposed resilient pads mounted within an upper zone of the dispenser; and FIG. 3 is a cross-sectional view taken along section line 3—3 in FIG. 1 and discloses another view of the leader/line spool and pair of resilient pads mounted within an upper zone of the dispenser wherein said resilient pads serve to erase the coil memory of the leader/line as it is being dispensed.

DETAILED DESCRIPTION

Figure 1:
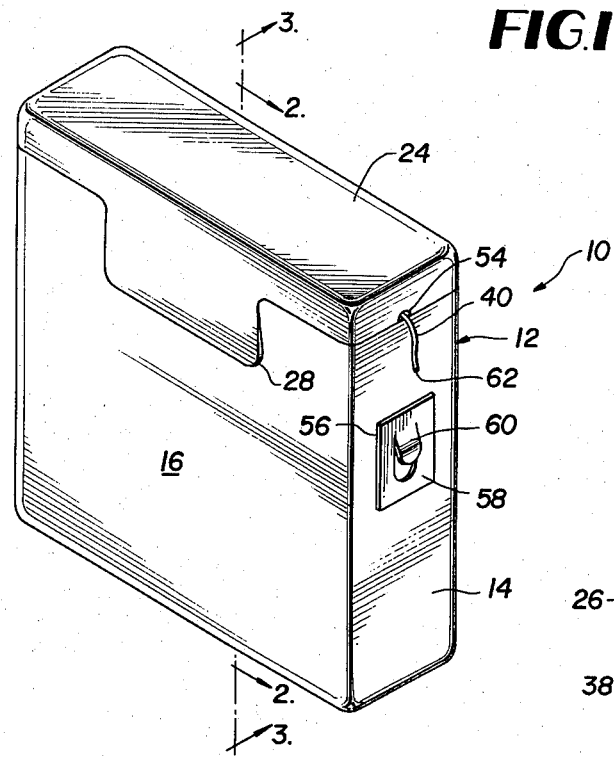

Referring now to the drawing and particularly to FIG. 1 thereof, there will be seen a fisherman's leader/line dispenser and decoiler 10 in accordance with a preferred embodiment of the invention. The decoiler unit 10 includes a container 12 having side walls 14, 16, 18 and 20 as well as a bottom 22 and a top or cap 24 pivotally mounted by a hinge 26 to the back wall surface 20. The cap 24 may include a downwardly extending lip 28 having a recess 30 for engagement with a bead 32 in an uppermost portion of side wall 16 to provide a releasable connection.

The container 12 may be composed of a metallic or wood composition but preferably is composed of a plastic composition and has a color component which will be opaque to ultraviolet light.

A spool 34 is mounted within the container 12 upon an axle 36 which in turn is carried by a bracket 38. The spool 34 is of a conventional design and serves to carry a number of yards of a monofilament strand composed of a material suitable for use as a fisherman's leader/line 40 such as nylon or the like.

A first resilient pad 42 is mounted within an upper zone of the container and in particular is fixedly connected to an interior surface of the cap 24. The resilient pad 42 is generally rectangular in configuration and is fashioned from a natural or synthetic rubber composition.

A second resilient pad 44 is mounted within an upper zone of the container. More specifically the second pad is carried by an upper most surface of the supporting bracket 38. In a manner similar to the first resilient pad the second resilient pad 44 is generally rectangular in configuration and is composed of a natural or synthetic rubber material.

Figure 2:
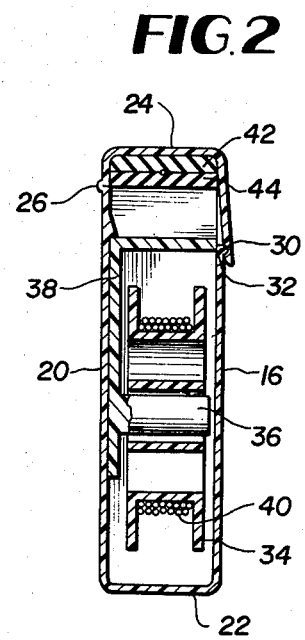
Figure 3:
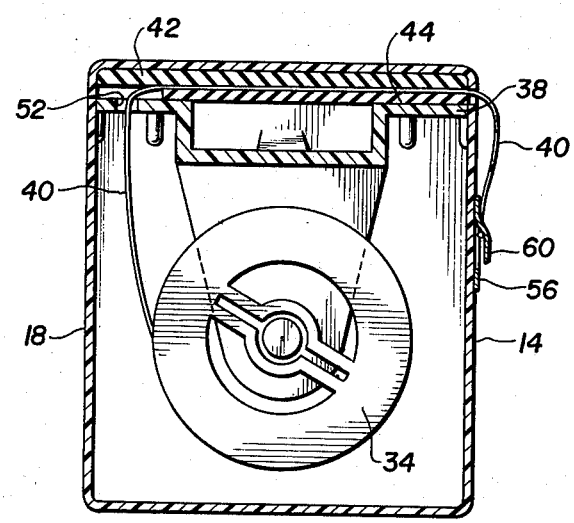

As best illustrated in FIGS. 2 and 3, the first and second resilient pads 42 and 44 are mounted within the container in mutually opposing self-biasing engagement when the container lid is closed.

A guide 52 is fashioned through the bracket 38 such that leader/line may be fed from the spool 34 into one end of the opposed resilient pads. An aperture 54 is fashioned through the container to permit the leader/line to be drawn through the pads and away from the container without opening the lid.

A metallic tab 56 is mounted upon an exterior surface of the container as at 58 and is fashioned with at least one sharply protruding edge 60 which is operable to serve as a breaking point for the monofilament leader/line 40 as depicted in FIG. 3.

In operation the leader/line 40 is threaded upwardly through the bracket guide 52 and through the self-biasing, resilient pads 42 and 44 to the aperture 54 formed through the container. In the event an angler should break a leader/line, the free end 62 of the leader projecting outwardly from the container is grasped and the desired length is dispensed from the container by a simple pulling motion. This dispensing operation draws the leader/line 40 through the mutually self-biasing resilient pads 42 and 44 which serve to erase the storage memory of the monofilament line and minimize a tendency of the leader/line to self coil. Once a suitable length is drawn from the container, a single wrap of the leader/line 40 about the sharp edge tab 60 and a slight pull will serve to facilely break the leader/line and provide a convenient free end for subsequent use.

In describing a fisherman's leader/line dispenser and decoiler in accordance with a preferred embodiment of the invention, those skilled in the art will recognize several advantages which singularly distinguish the invention from previously known leader/line dispensers.

A particular advantage of the invention is the provision of the mutually opposed self-biasing pads 42 and 44 which extend within an upper zone of the container and serve to decoil or erase the storage memory of the monofilament leader/line drawn from the spool within the container.

The subject fisherman's leader/line dispenser and decoiler holds the free end of the severed leader/line in position, such that an angler may readily grasp the free end during subsequent use.

The container per se is formed a material opaque to ultraviolet light and thus the monofilament leader/line is protected from ultraviolet deterioration while it is being stored.

The subject leader/line dispenser combination is also provided with a sharp edged tab which serves to facilely permit breakage of a desired length of line without utilization of a separate cutting instrument.

In describing the invention, reference has been made to a preferred embodiment. Those skilled in the art, however, and familiar with the instant disclosure may recognize additions, deletions, modifications, substitutions and/or other changes which will fall within the purview of the subject invention as herein claimed.

What is claimed is:

1. A fisherman's leader/line dispenser and decoiler comprising:
   container means having side walls, a bottom and a top;
   a spool of fisherman's leader/line mounted within said container means;
   first longitudinally extending, generally rectangular, resilient pad means mounted within said contained means;
   second longitudinally extending, generally rectangular, resilient pad means mounted within said container means in an opposing posture with respect to said first resilient pad means, said first and second resilient pad means being mounted so as to be self-biasing in mutual opposing engagement;
   said top comprises a cap and one of said first and second resilient pad means is mounted upon an inside surface of said cap and the other of said first and second resilient pad means is mounted above said spool of fisherman's leader/line, said first and second resilient pad means extend substantially across an upper zone of said container; and
   aperture means extending through said container means wherein a fisherman's leader/line may be threaded from said spool between said mutually opposed longitudinally extending resilient pads and through said aperture means away from said container means wherein drawing a length of leader/line between said first and second longitudinally extending resilient pad means along the long dimensions thereof and out said container serves to erase coil memory of the leader/line as the leader/line is dispensed.

2. A fisherman's leader/line dispenser and decoiler as defined in claim 1 and further comprising:
   metallic tab means mounted on an exterior surface of said container means and having at least one sharp edge for providing a break point for a length of leader/line dispensed from said container.

3. A fisherman's leader/line dispenser and decoiler as defined in claim 1 wherein:
   said container means is fabricated from a material opaque to ultraviolet light.

4. A fisherman's leader/line dispenser and decoiler comprising:
   container means having side walls, a bottom and a cap;
   a spool of fisherman's leader/line mounted within said container means;
   first resilient pad means mounted within said container;
   second resilient pad means mounted within said container means in an opposing posture with respect to said first resilient pad means, said first and second resilient pad means being mounted so as to be self-biasing in mutual opposing engagement;
   one of said first and second resilient pad means is mounted upon an inside surface of said cap and the other of said first and second resilient pad means is mounted within the container above said spool of fisherman's leader;

said first and second resilient pads have a generally rectangular configuration and extend substantially across an upper zone of said container wherein the leader/line will be drawn along the long dimension of said first and second resilient pads during a dispensing operation; and aperature means extending through said container means whereby a fisherman's leader/line may be threaded from said spool between said mutually opposed resilient pads and through said aperature means away from said container means wherein drawing a length of leader/line between said first and second resilient pad means and out of said container serves to erase coil memory of the leader/line as the leader/line is dispensed.

5. A fisherman's leader/line dispenser and decoiler as defined in claim 4 and further comprising:

metallic tab means mounted on an exterior surface of said container means and having at least one sharp edge for providing a break point for a length of leader/line dispensed from said container.

6. A fisherman's leader/line dispenser and decoiler as defined in claim 4 wherein:

said container means is fabricated from a material opaque to ultraviolet light.

* * * * *